US008200478B2

(12) United States Patent
Ebihara et al.

(10) Patent No.: US 8,200,478 B2
(45) Date of Patent: Jun. 12, 2012

(54) VOICE RECOGNITION DEVICE WHICH RECOGNIZES CONTENTS OF SPEECH

(75) Inventors: Takashi Ebihara, Tokyo (JP); Jun Ishii, Tokyo (JP); Hiroki Sakashita, Tokyo (JP); Kazuyuki Nogi, Hyogo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/123,552

(22) PCT Filed: Oct. 20, 2009

(86) PCT No.: PCT/JP2009/005487
§ 371 (c)(1),
(2), (4) Date: Apr. 11, 2011

(87) PCT Pub. No.: WO2010/086927
PCT Pub. Date: Aug. 5, 2010

(65) Prior Publication Data
US 2011/0196672 A1    Aug. 11, 2011

(30) Foreign Application Priority Data

Jan. 30, 2009 (JP) ................................. 2009-019702

(51) Int. Cl.
*G06F 17/21* (2006.01)
*G10L 15/02* (2006.01)

(52) U.S. Cl. ............................ 704/10; 704/254; 704/251
(58) Field of Classification Search .................. None
See application file for complete search history.

(56) References Cited

U.S. PATENT DOCUMENTS

| 7,505,904 B2 | 3/2009 | Kuboyama et al. | |
|---|---|---|---|
| 2009/0265159 A1* | 10/2009 | Li et al. | 704/8 |
| 2010/0145699 A1* | 6/2010 | Tian | 704/257 |
| 2010/0324899 A1* | 12/2010 | Yamabana | 704/251 |

FOREIGN PATENT DOCUMENTS

| JP | 11-282486 A | 10/1999 |
|---|---|---|
| JP | 2001-306088 A | 11/2001 |
| JP | 2002-297181 A | 10/2002 |
| JP | 2003-015687 A | 1/2003 |
| JP | 2003-337595 A | 11/2003 |
| JP | 2004-252167 A | 9/2004 |
| JP | 2004-325704 A | 11/2004 |
| JP | 2006-178013 A | 7/2006 |
| JP | 2009-145548 A | 7/2009 |
| JP | 2010-097239 A | 4/2010 |

OTHER PUBLICATIONS

Itoh, Y. et al. "Partial Sentence Recognition by Sentence Spotting", IEICE Technical Report, Jun. 18, 1993, vol. 93, No. 88, pp. 65-72.

* cited by examiner

*Primary Examiner* — Talivaldis Ivars Smits
(74) *Attorney, Agent, or Firm* — Birch, Stewart, Kolasch & Birch, LLP

(57) ABSTRACT

A voice recognition device is provided with a sentence selecting unit for selecting sentences each having a predetermined number or less of acoustic units as sentences to be recognized from candidates for the sentences to be recognized. According to an exemplary embodiment, the sentence selecting unit may define the selected sentences as sentences to be recognized. According to another exemplary embodiment, when a candidate for a sentence to be recognized has a number of acoustic units exceeding the predetermined number, one or more acoustic units may be trimmed from the candidate, and the trimmed candidate may be defined as one of the sentences to be recognized.

7 Claims, 14 Drawing Sheets

FIG.3

Example of Creating a Voice Recognition Dictionary Only from Sentences Each Having Phonemes Whose Number Is Equal to or Smaller Than 20

| Number | Sentence | Phonemes | Number of Phonemes | Selectable or Unselectable |
|---|---|---|---|---|
| 1 | Kanagawaken Kamakurasi | kanagawakeN kamakurasi | 21 | Unselectable |
| 2 | Hyogoken Sandasi | hyoogokeN saNdasi | 16 | Selectable |
| 3 | Shigaken Ootusi | sigakeN ootusi | 13 | Selectable |
| 4 | Oosakahu Oosakasi | oosakahu oosakasi | 16 | Selectable |
| 5 | Naraken Narasi | narakeN narasi | 13 | Selectable |
| 6 | Iwateken Rikuzentakatasi | iwatekeN rikuzentakatasi | 23 | Unselectable |
| 7 | Aitiken Nagoyasi | aitikeN nagoyasi | 15 | Selectable |
| 8 | Naraken Yamatokooriyamasi | narakeN yamatokooriyamasi | 24 | Unselectable |

FIG.6

Example of Selecting Sentences in the Case in Which
the Total Number of Phonemes Is Limited to 100 or Less

| Number | Sentence | Phonemes | Number of Phonemes | Selectable or Unselectable |
|---|---|---|---|---|
| 1 | Shigaken Ootusi | sigakeN ootusi | 13 | Selectable |
| 2 | Naraken Narasi | narakeN narasi | 13 | Selectable |
| 3 | Aitiken Nagoyasi | aitikeN nagoyasi | 15 | Selectable |
| 4 | Hyogoken Sandasi | hyoogokeN saNdasi | 16 | Selectable |
| 5 | Oosakahu Oosakasi | oosakahu oosakasi | 16 | Selectable |
| 6 | Kanagawaken Kamakurasi | kanagawakeN kamakurasi | 21 | Selectable |
| 7 | Iwateken Rikuzentakatasi | iwatekeN rikuzentakatasi | 23 | Unselectable |
| 8 | Naraken Yamatokooriyamasi | narakeN yamatokooriyamasi | 24 | Unselectable |

Number of Phonemes Exceeds 100

FIG.9

Example of Trimming Each Sentence Having 20 or More of Phonemes and Creating a Voice Recognition Dictionary

| Number | Sentence | Phonemes | Number of Phonemes | Trimming |
|---|---|---|---|---|
| 1 | Kanagawaken Kamakurasi | kanagawakeN kamakurasi | 21 | Necessary |
| 2 | Hyogoken Sandasi | hyoogokeN saNdasi | 16 | Unnecessary |
| 3 | Shigaken Ootusi | sigakeN ootusi | 13 | Unnecessary |
| 4 | Oosakahu Oosakasi | oosakahu oosakasi | 16 | Unnecessary |
| 5 | Naraken Narasi | narakeN narasi | 13 | Unnecessary |
| 6 | Iwateken Rikuzentakatasi | iwatekeN rikuzentakatasi | 23 | Necessary |
| 7 | Aitiken Nagoyasi | aitikeN nagoyasi | 15 | Unnecessary |
| 8 | Naraken Yamatokooriyamasi | narakeN yamatokooriyamasi | 24 | Necessary |

After Trimmed

| Number | Sentence | Phonemes | Number of Phonemes | Trimming |
|---|---|---|---|---|
| 1 | Kanagawaken Kamakura | kanagawakeN kamakura | 19 | Trimmed |
| 2 | Hyogoken Sandasi | hyoogokeN saNdasi | 16 | Unnecessary |
| 3 | Shigaken Ootusi | sigakeN ootusi | 13 | Unnecessary |
| 4 | Oosakahu Oosakasi | oosakahu oosakasi | 16 | Unnecessary |
| 5 | Naraken Narasi | narakeN narasi | 13 | Unnecessary |
| 6 | Iwateken Rikuzentaka | iwatekeN rikuzentaka | 19 | Trimmed |
| 7 | Aitiken Nagoyasi | aitikeN nagoyasi | 15 | Unnecessary |
| 8 | Naraken Yamatokooriya | narakeN yamatokooriya | 20 | Trimmed |

FIG.14

Following Sets of Words Cannot Be Recognized Because They Are Too Long

Kanagawaken Kamakurasi
Iwateken Rikuzentakatasi
Naraken Yamatokooriyamasi

VOICE RECOGNITION DEVICE WHICH RECOGNIZES CONTENTS OF SPEECH

FIELD OF THE INVENTION

The present invention relates to a voice recognition (speech recognition) device which recognizes contents of speech.

BACKGROUND OF THE INVENTION

A conventional voice recognition device converts the possibility of confusing a new word and an already-registered word into a number and then evaluating this number to determine whether to register the new word (for example, refer to patent reference 1). Furthermore, patent reference 2 discloses a voice recognition device that has a storage unit for voice recognition having a hierarchical structure and that performs voice recognition while predicting the content of a following utterance by gradually narrowing an inclusive range.

RELATED ART DOCUMENT

Patent Reference

Patent reference 1: JP,2002-297181,A
Patent reference 2: JP,2004-325704,A

SUMMARY OF THE INVENTION

A conventional voice recognition device creates a voice recognition dictionary by using a text notation of each sentence which is an object to be recognized. In a case in which there are many sentences which are objects to be recognized or each sentence is long, the voice recognition dictionary increases in size. For example, in a case in which a voice recognition device is implemented via embedded software for use in equipment, such as a navigation system or a mobile phone, the memory of this equipment has a limitation. A problem is therefore that when the voice recognition dictionary size exceeds the usable capacity of the memory, the voice recognition device does not operate normally.

In contrast, although the conventional voice recognition device disclosed by patent reference 1 determines whether to register a new word from the evaluated value about the possibility of confusing the new word and an already-registered word, a case in which the voice recognition device is implemented via software is not taken into consideration and hence a case in which a limitation is imposed on the capacity of the memory is not taken into consideration. Therefore, the above-mentioned problem cannot be solved by the conventional voice recognition device disclosed by patent reference 1.

Furthermore, the voice recognition device disclosed by patent reference 2 creates a voice recognition dictionary in consideration of reduction in the recognition performance due to increase in the number of recognizable words, but does not take into consideration a case in which a limitation is imposed on the capacity of the memory, like the above-mentioned conventional voice recognition device. Therefore, the above-mentioned problem cannot be solved by the conventional voice recognition device disclosed by patent reference 2.

The present invention is made in order to solve the above-mentioned problem, and it is therefore an object of the present invention to provide a voice recognition device that can suppress increase in the dictionary size of a voice recognition dictionary thereof.

A voice recognition device in accordance with the present invention is provided with a sentence selecting unit for selecting sentences each having a predetermined number or less of acoustic units as sentences to be recognized from among candidates for the sentences to be recognized.

Because the voice recognition device in accordance with the present invention selects sentences each having acoustic units whose number is equal to or smaller than the predetermined number from among the candidates for the sentences to be recognized as sentences to be recognized, the voice recognition device can suppress increase in the size of a voice recognition dictionary which consists of the above-mentioned sentences to be recognized. Furthermore, there is provided an advantage of, even in a case in which the voice recognition device is implemented via embedded software for use in equipment, such as a navigation system or a mobile phone, being able to implement a voice recognition dictionary with a dictionary size falling within the usable capacity of a memory disposed therein.

BRIEF DESCRIPTION OF THE FIGURES

FIG. 3 is a view for explaining a process of excluding a candidate for sentences to be recognized;

FIG. 6 is a view for explaining a process of creating a dictionary in accordance with Embodiment 2;

FIG. 9 is a view for explaining a process of trimming a candidate for sentences to be recognized;

FIG. 14 is a view showing an example of informing sets of words to be excluded.

EMBODIMENTS OF THE INVENTION

Hereafter, in order to explain this invention in greater detail, the preferred embodiments of the present invention will be described with reference to the accompanying drawings.

Embodiment 1

Figure 1:
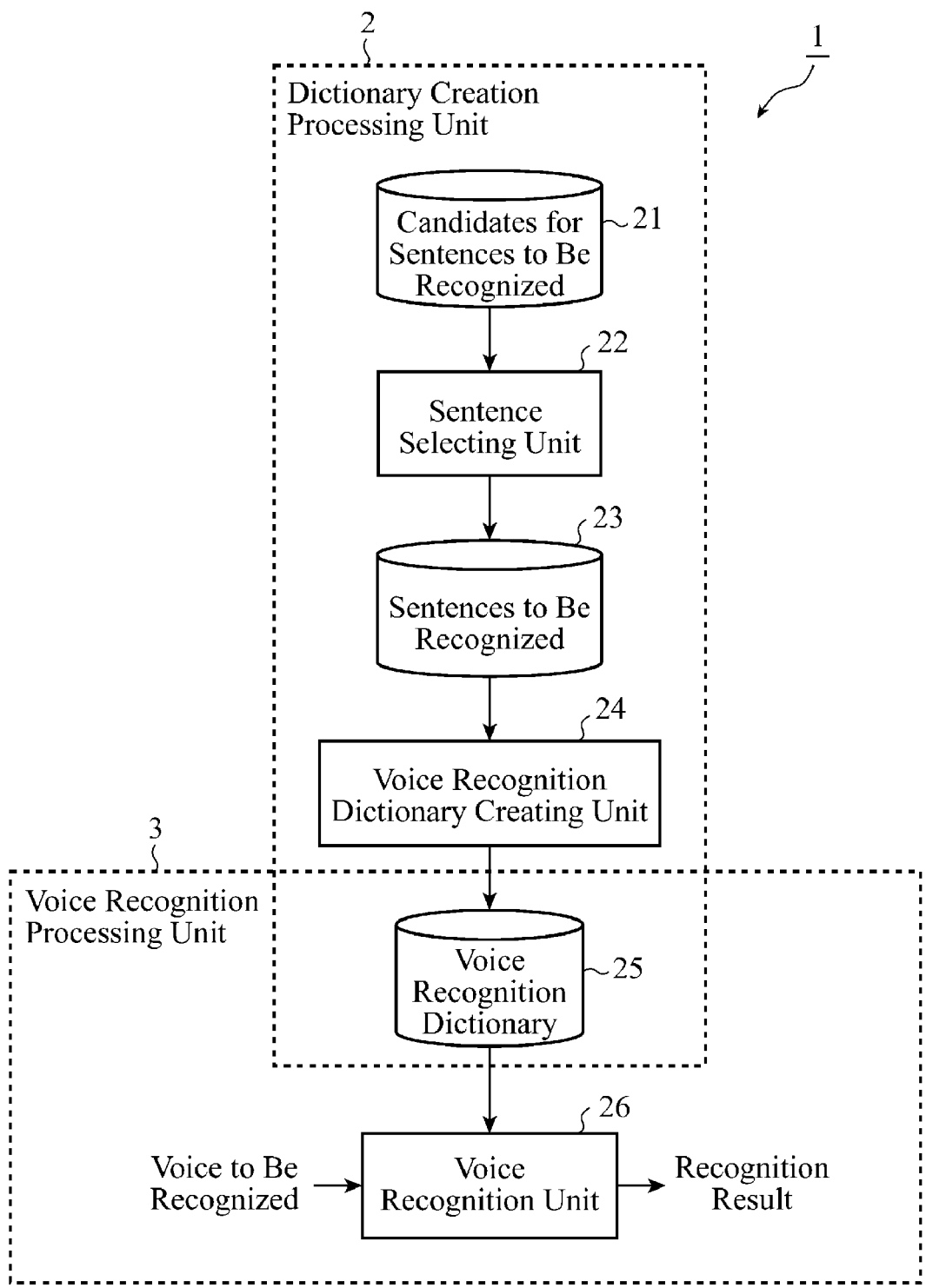
FIG. 1 is a block diagram showing the structure of a voice recognition device in accordance with Embodiment 1 of the present invention.

FIG. 1 is a block diagram showing the structure of a voice recognition device in accordance with Embodiment 1 of the present invention. In FIG. 1, the voice recognition device 1 in accordance with Embodiment 1 is provided with a dictionary creation processing unit 2 and a voice recognition processing unit 3. The dictionary creation processing unit 2 is a unit for creating a voice recognition dictionary which is constructed of only sentences each having a predetermined number or less of acoustic units, and is provided with a sentence-to-be-recognized candidate storage unit 21, a sentence selecting unit 22, a sentence-to-be-recognized storage unit 23, a voice recognition dictionary creating unit 24, and a voice recognition dictionary storage unit 25.

Each sentence-to-be-recognized candidate stored in the storage unit 21 is comprised of a set of a candidate for a text which is to be recognized by the voice recognition device 1, and acoustic units showing the pronunciation of the text. In this embodiment, each sentence to be recognized means a sentence having acoustic units whose number is the predetermined number or less. Furthermore, each acoustic unit is a short phonetic unit, such as a phoneme or a syllable. The larger number of acoustic units each sentence to be recognized has, the larger size the voice recognition dictionary has. Therefore, the voice recognition device 1 in accordance with Embodiment 1 creates the voice recognition dictionary from only sentences each having acoustic units whose number is equal to or smaller than the predetermined number, thereby preventing increase in the dictionary size.

The sentence selecting unit 22 is a unit for using, as acoustic units, phonemes, and excluding sentence-to-be-recognized candidates each having phonemes whose number exceeds a defined number preset for each sentence to be recognized from the sentence-to-be-recognized candidates to select a sentence to be recognized having phonemes whose number is equal to or smaller than the above-mentioned defined number. The voice recognition dictionary creating unit 24 is a unit for creating a voice recognition dictionary by using the sentences to be recognized read from the storage unit 23.

The voice recognition processing unit 3 is provided with a voice recognition dictionary storage unit 25 and a voice recognition unit 26. The voice recognition unit 26 is a unit for performing a voice recognition process on a voice uttered by a user which is an object to be recognized (referred to as a voice to be recognized from here on) with reference to the voice recognition dictionary stored in the storage unit 25 to acquire a recognition result.

By causing a computer to read a dictionary creation and voice recognition program according to the scope of the present invention and then causing the CPU of the computer to execute the dictionary creation and voice recognition program, the sentence selecting unit 22, the voice recognition dictionary creating unit 24, and the voice recognition unit 26 can be implemented on the computer as concrete units in each of which hardware and software work in cooperation with each other. Furthermore, the sentence-to-be-recognized candidate storage unit 21, the sentence-to-be-recognized storage unit 23, and the voice recognition dictionary storage unit 25 can be constructed in a storage area of a storage unit which the above-mentioned computer has (e.g., a hard disk drive unit or an external storage medium).

Next, the operation of the voice recognition device will be explained.

Figure 2:
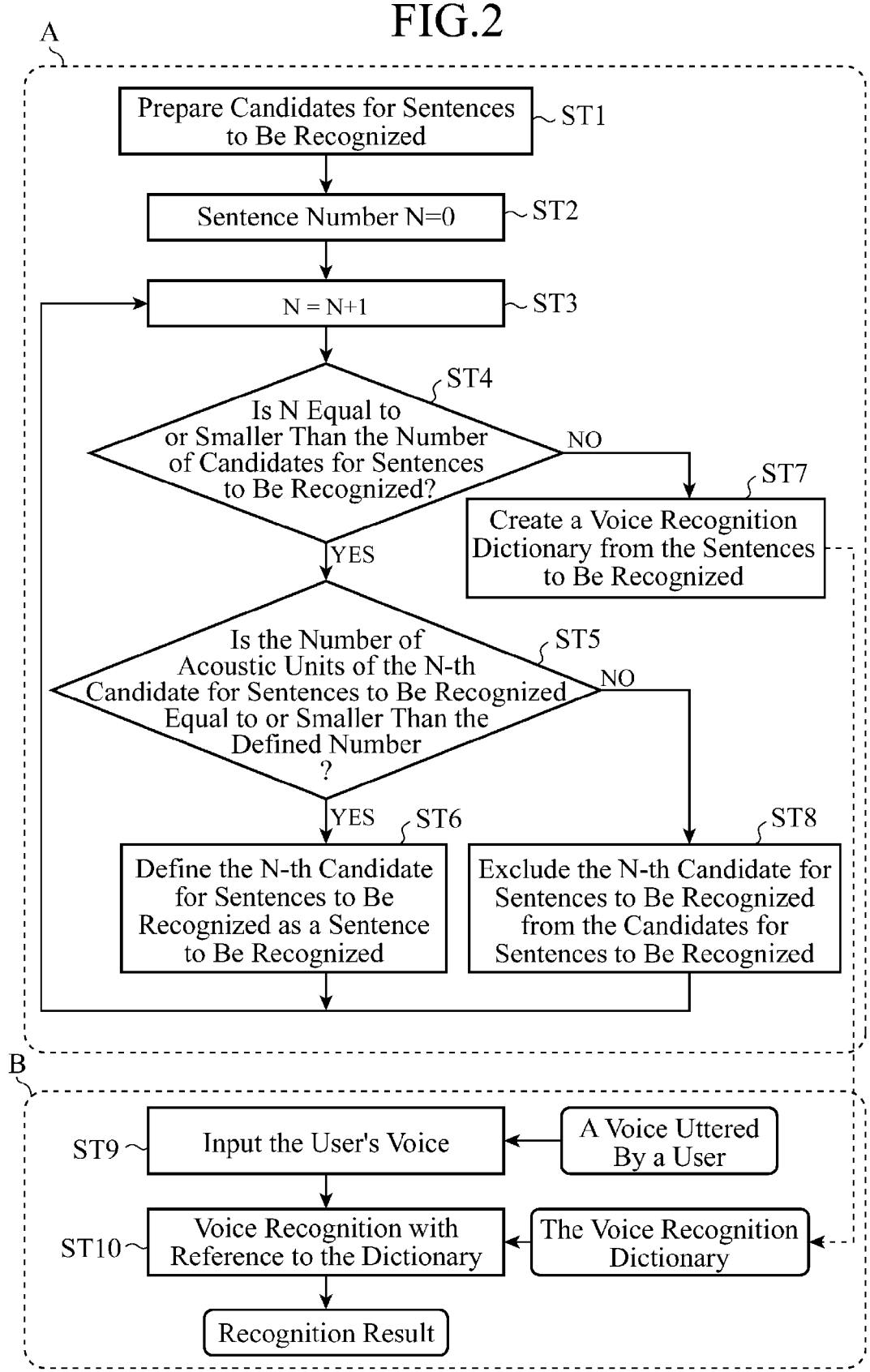
FIG. 2 is a flow chart showing a flow of the operation of the voice recognition device in accordance with Embodiment 1.

FIG. 2 is a flow chart showing a flow of the operation carried out by the voice recognition device in accordance with Embodiment 1. Steps enclosed by a dashed line designated by a symbol A in FIG. 2 show processes carried out by the dictionary creation processing unit 2, and steps enclosed by a dashed line designated by a symbol B in FIG. 2 show processes carried out by the voice recognition processing unit 3.

First, the sentence selecting unit 22 reads sentence-to-be-recognized candidates used for creating a voice recognition dictionary from the storage unit 21 to prepare the sentence-to-be-recognized candidates (step ST1). Next, the sentence selecting unit 22 initializes the counted value of a counter (not shown in FIG. 1) for counting a sentence number N which is a serial number, which is to be given to each of the sentence-to-be-recognized candidates, serial numbers being put on the sentence-to-be-recognized candidates in the order that they are processed, to 0 (N=0) (step ST2).

The sentence selecting unit 22 increments the counted value of the above-mentioned counter by one (step ST3), and determines if the sentence number N is equal to or smaller than the number of sentence-to-be-recognized candidates which have been read out of the storage unit 21 (step ST4). When the sentence number N is equal to or smaller than the number of sentence-to-be-recognized candidates (if Yes in step ST4), the sentence selecting unit 22 determines if the sentence-to-be-recognized candidate corresponding to the current sentence number N has acoustic units whose number is equal to or smaller than the defined number (step ST5). When the sentence-to-be-recognized candidate corresponding to the sentence number N has acoustic units whose number is equal to or smaller than the defined number (if Yes in step ST5), the sentence selecting unit 22 stores the sentence-to-be-recognized candidate corresponding to the publication number N in the storage unit 23 as a sentence to be recognized (step ST6).

In contrast, when the sentence-to-be-recognized candidate corresponding to the sentence number N has acoustic units whose number is neither equal to nor smaller than the defined number (if No in step ST5), the sentence selecting unit 22 excludes the sentence having the sentence number N from the sentence-to-be-recognized candidates (step ST8). After completing the process of step ST6 or step ST8, the sentence selecting unit 22 returns to step ST3 and increments the counted value of the counter for counting the sentence number N by one, and repeatedly performs the processes in steps ST4 to ST8 on the sentence-to-be-recognized candidate corresponding to the next sentence number.

Hereafter, the excluding process in step ST8 will be explained.

FIG. 3 is a view for explaining the process of excluding sentence-to-be-recognized candidates. A case in which phonemes are used as acoustic units, and each sentence-to-be-recognized candidate whose number of phonemes exceeds 20 is excluded from the sentence-to-be-recognized candidates is shown. As shown in FIG. 3, a sentence-to-be-recognized candidate having the sentence number N=1 which is "Kanagawaken Kamakurasi" has a phoneme string of "kanagawakeN kamakurasi" (21 phonemes), and is excluded from the sentence-to-be-recognized candidates because the number of phonemes included in the sentence-to-be-recognized candidate exceeds 20. Similarly, because each of sentences having sentence numbers N=6 and 8 has phonemes whose number exceeds 20, they are excluded from the sentence-to-be-recognized candidates. In contrast, sentences having sentence numbers N=2 to 5 and 7 are stored in the storage unit 23 as sentences to be recognized.

Because the phonemes which construct each sentence to be recognized correspond respectively to acoustic models, the number of phonemes which construct each sentence to be recognized affects the size of the voice recognition dictionary greatly. Therefore, in accordance with this Embodiment 1, because all candidate sentences each having phonemes whose number exceeds the defined number are excluded from the sentence-to-be-recognized candidates, increase in the dictionary size can be prevented. In the example of FIG. 3, instead of counting every phoneme which constructs each sentence to determine the number of phonemes which construct each sentence, the number of phonemes can be calculated by using a molar number.

Referring again to the explanation of FIG. 2, when the sentence number N exceeds the number of prepared sentence-to-be-recognized candidates (the sentence number N>the number of sentence-to-be-recognized candidates) (if No in step ST4), the voice recognition dictionary creating unit 24 creates a voice recognition dictionary from the sentences to be recognized which have been stored in the storage unit 23 until then (step ST7). The created voice recognition dictionary is stored in the storage unit 25.

The voice recognition unit 26 of the voice recognition processing unit 3 inputs a voice to be recognized uttered by a user (step ST9), and performs a voice recognition process on the voice to be recognized with reference to the voice recognition dictionary stored in the storage unit 25, and outputs a recognition result (step ST10).

As mentioned above, because the voice recognition device in accordance with this Embodiment 1 is provided with the sentence selecting unit 22 for selecting sentences each having acoustic units whose number is equal to or smaller than the predetermined number, as sentences to be recognized, from among sentence-to-be-recognized candidates, the voice recognition device can suppress increase in the dictionary size of the voice recognition dictionary, and, even in a case in which the voice recognition device is implemented via embedded software for use in equipment, such as a navigation system or a mobile phone, can implement the voice recognition dictionary with a dictionary size falling within the usable capacity of the memory. Accordingly, the voice recognition device is suitable for a case in which the voice recognition device is constructed by using embedded software.

Embodiment 2

Figure 4:
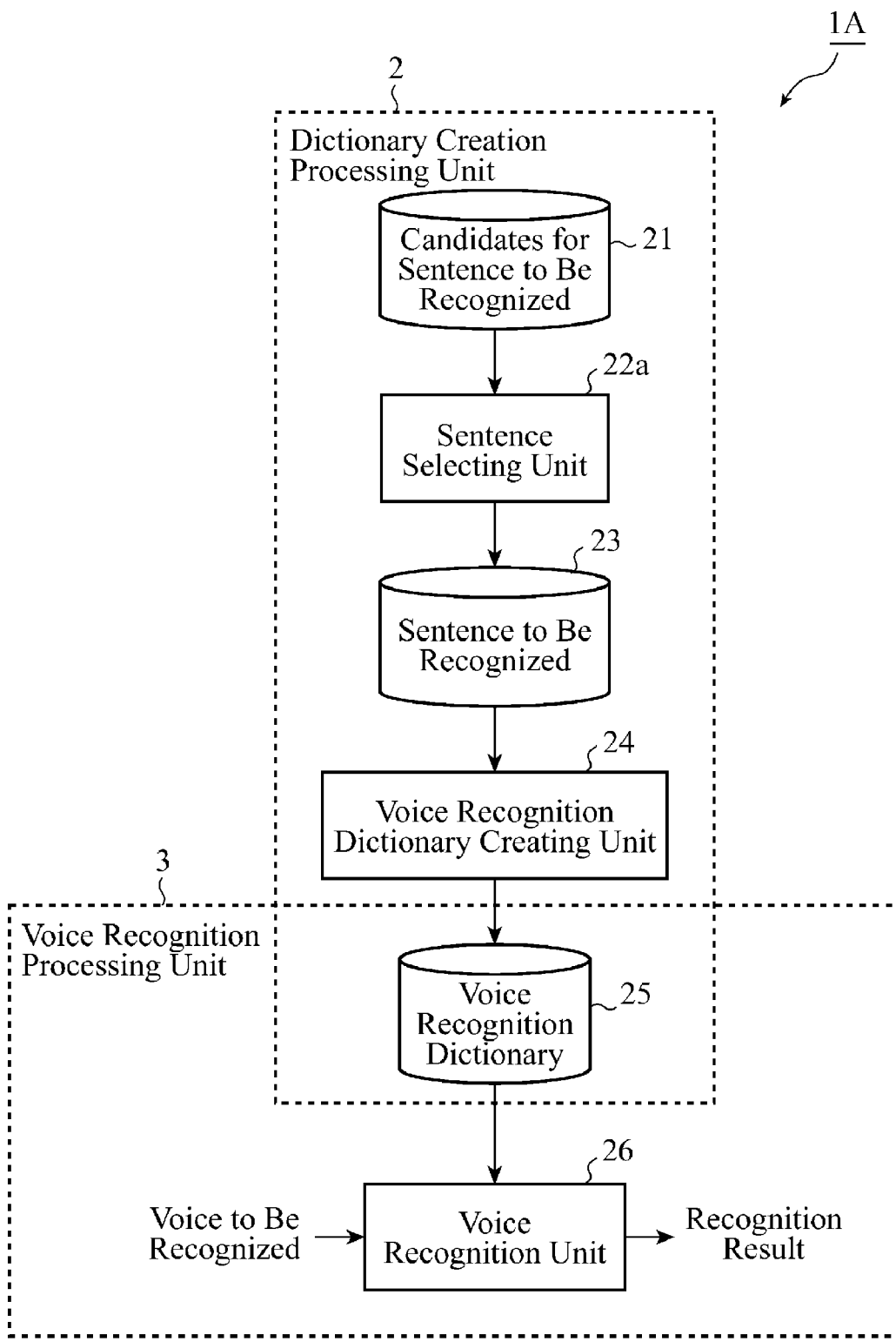
FIG. 4 is a block diagram showing the structure of a voice recognition device in accordance with Embodiment 2 of the present invention.

FIG. 4 is a block diagram showing the structure of a voice recognition device in accordance with Embodiment 2 of the present invention. As shown in FIG. 4, although the voice recognition device 1A in accordance with Embodiment 2 has the same structure as that in accordance with above-mentioned Embodiment 1 shown in FIG. 1 fundamentally, the voice recognition device in accordance with Embodiment 2 differs from that in accordance with Embodiment 1 in that a sentence selecting unit 22a for selecting sentences to be recognized according to the total number of acoustic units included in all the sentence-to-be-recognized candidates is disposed instead of the sentence selecting unit 22 for selecting sentences to be recognized according to the number of acoustic units included in each sentence-to-be-recognized candidate.

The sentence selecting unit 22a selects sentences to be recognized in such a way that the sum total of the numbers of acoustic units included in all the sentence-to-be-recognized candidates are equal to or smaller than a defined number, and stores the selected sentences to be recognized in a storage unit 23. Because the other structural components other than a voice recognition processing unit 3 and the sentence selecting unit 22a of a dictionary creation processing unit 2 are the same as those in accordance with above-mentioned Embodiment 1, the explanation of the other structural components will be omitted hereafter.

Next, the operation of the voice recognition device will be explained.

Figure 5:
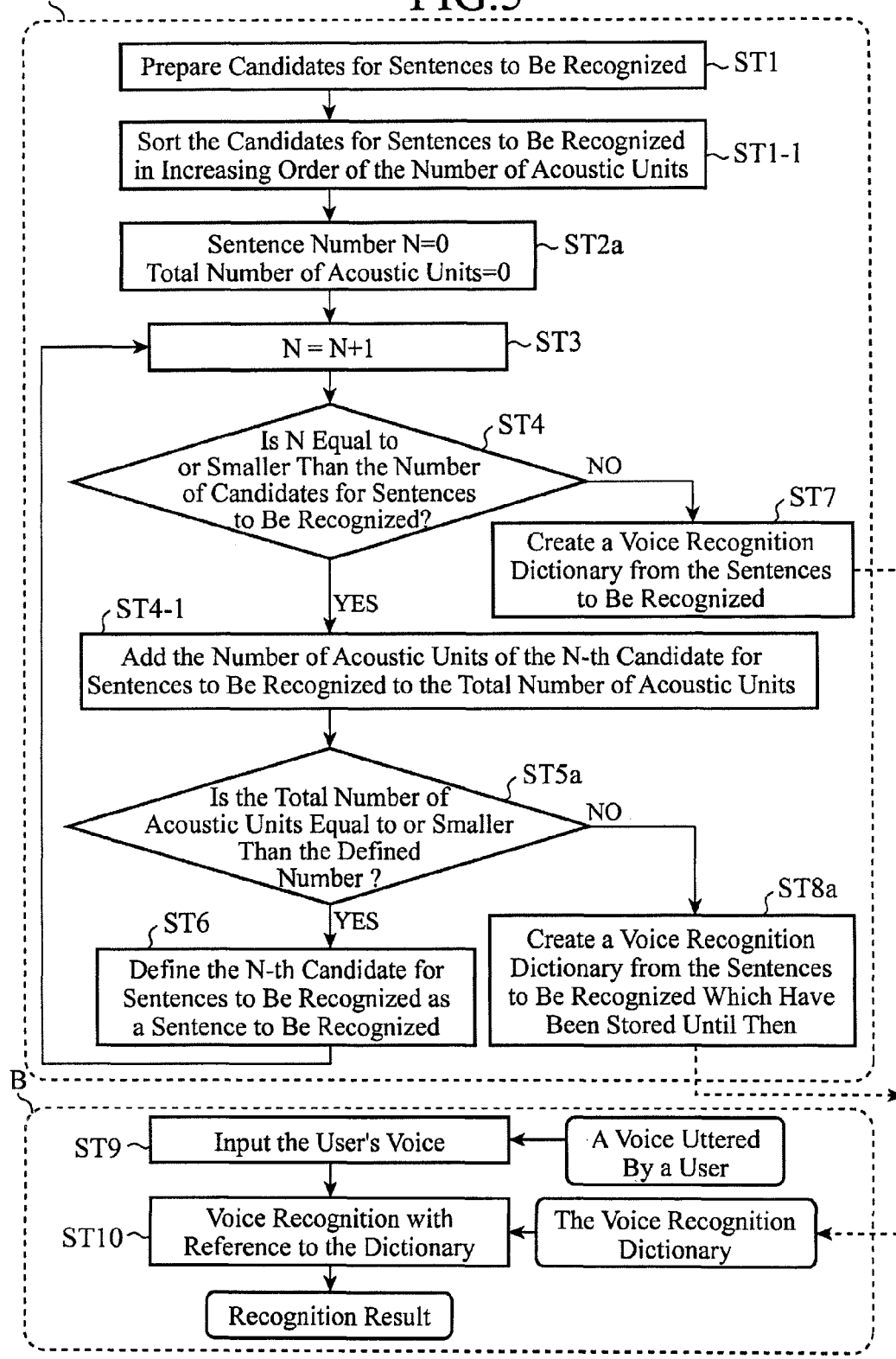
FIG. 5 is a flow chart showing a flow of the operation of the voice recognition device in accordance with Embodiment 2.

FIG. 5 is a flow chart showing a flow of the operation carried out by the voice recognition device in accordance with Embodiment 2. Steps enclosed by a dashed line designated by a symbol A in FIG. 5 show processes carried out by the dictionary creation processing unit 2, and steps enclosed by a dashed line designated by a symbol B in FIG. 5 show processes carried out by the voice recognition processing unit 3.

First, the sentence selecting unit 22a reads sentence-to-be-recognized candidates used for creating a voice recognition dictionary from a storage unit 21 to prepare the sentence-to-be-recognized candidates (step ST1). Next, the sentence selecting unit 22a sorts all the prepared sentence-to-be-recognized candidates in increasing order of the number of acoustic units (step ST1-1). Next, the sentence selecting unit 22a initializes the counted value of a counter (not shown in FIG. 4) for counting a sentence number N which is a serial number, which is to be given to each of the sentence-to-be-recognized candidates, serial numbers being put on the sentence-to-be-recognized candidates in the order that they are processed, to 0 (N=0), and also initializes the counted value of a counter (not shown in FIG. 4) for counting the total number of acoustic units included in all sentence-to-be-recognized candidates to 0 (step ST2a).

The sentence selecting unit 22a increments the counted value of the counter for counting the sentence number N by one (step ST3), and determines if the sentence number N is equal to or smaller than the number of sentence-to-be-recognized candidates which have been read out of the storage unit 21 (step ST4). When the sentence number N is equal to or smaller than the number of sentence-to-be-recognized candidates (if Yes in step ST4), the sentence selecting unit 22 adds the number of acoustic units of the sentence having the sentence number N to the counted value of the counter for counting the total number of acoustic units (step ST4-1).

Next, the sentence selecting unit 22a determines if the total number of acoustic units shown by the counted value of the above-mentioned counter is equal to or smaller than a defined number (step ST5a). When the total number of acoustic units is equal to or smaller than the defined number (if Yes in step ST5a), the sentence selecting unit 22a stores the sentence-to-be-recognized candidate having the sentence number N in the storage unit 23 as a sentence to be recognized (step ST6).

When the sentence number N exceeds the number of prepared sentence-to-be-recognized candidates (the sentence number N>the number of sentence-to-be-recognized candidates) (if No in step ST4), a voice recognition dictionary creating unit 24 creates a voice recognition dictionary from the sentences to be recognized which have been stored in the storage unit 23 until then (step ST7). When the total number of acoustic units exceeds the defined number (if No in step ST5a), the sentence selecting unit 22a stops storing sentences to be recognized in the storage unit 23, and the voice recognition dictionary creating unit 24 creates a voice recognition dictionary from the sentences to be recognized which have been stored in the storage unit 23 until then and stores the voice recognition dictionary in the storage unit 25 (step ST8a).

After selecting the sentence to be recognized in step ST6, the sentence selecting unit 22a returns to step ST3 and increments the counted value of the counter for counting the sentence number N by one, and then repeatedly performs the processes insteps ST4 to ST8a on the sentence-to-be-recognized candidate corresponding to the next sentence number.

A voice recognition process of referring to the voice recognition dictionary created through the above-mentioned processes (steps ST9 and ST10) is the same as that shown in above-mentioned Embodiment 1.

FIG. 6 is a view for explaining a process carried out by the dictionary creation processing unit in accordance with Embodiment 2, and shows a case in which phonemes are used as acoustic units and sentence-to-be-recognized candidates including phonemes whose total number do not exceed 100 can be selected as sentences to be recognized. In the example shown in FIG. 6, the sentence selecting unit 22a sequentially selects sentences with a smaller number of phonemes, and stops the selection when the total number of phonemes included in all the sentence already-selected exceeds 100. More specifically, in the example, the total number of phonemes included in the sentences having sentence numbers N=1 to N=6 are 94 phonemes in total, and therefore the addition of the number of phonemes of the sentence having the next sentence number N=7 results in the total number of phonemes exceeding 100. Therefore, the sentences including up to "Kanagawaken Kamakurasi" having the sentence number N=6 are selected as sentences to be recognized.

In this Embodiment 2, a plurality of sentences which can be sentences to be recognized are selected sequentially as long as the sum total of the numbers of acoustic units included in the plurality of sentences do not exceed the defined number. The larger total number of acoustic units all the sentences to be recognized have, the larger size the voice recognition dictionary has. Therefore, by creating the voice recognition dictionary whose total number of acoustic units is equal to or smaller than the predetermined number, the voice recognition device in accordance with this embodiment can prevent increase in the dictionary size. The sentence selecting unit 22a for selecting sentences to be recognized according to the total number of acoustic units sums the total number of phonemes included in the sentence-to-be-recognized candidates already selected thereby by using phonemes as acoustic units, and, when the sum total (the total number of acoustic units) obtained until then exceeds the defined number, excludes the currently-selected sentence and all the subsequent sentences to provide all the sentences to be recognized already selected.

In above-mentioned Embodiment 2, when the total number of acoustic units included in the already-selected sentence-to-be-recognized candidates exceeds the defined value in step ST5a, the sentence selecting unit 22a can select a sentence-to-be-recognized candidate which should be excluded according to the result of the voice recognition process carried out in step ST10.

For example, the sentence selecting unit reinstalls a sentence having a large number of acoustic units as a sentence-to-be-recognized candidate, and uses this sentence, as a sentence to be recognized, for creation of a voice recognition dictionary after the next selection process. When the voice recognition result which is acquired with reference to the voice recognition dictionary created as a result of this is a good one, the voice recognition device presents a notification showing this result to the user to cause the user to determine whether to exclude the sentence.

Furthermore, when the total number of acoustic units included in the already-selected sentence-to-be-recognized candidates exceeds the defined value, the voice recognition device can carry out a process of trimming a sentence, which will be mentioned below in Embodiment 3, to adjust the total number of acoustic units. In this case, the sentence selecting unit 22a can provide a GUI (Graphical User Interface) for selection of sentences which are to be subjected to the trimming process to enable the user to select sentences which are to be subjected to the trimming process according to the GUI.

As mentioned above, when the total number of acoustic units exceeds the defined value and when the sentence number N>the number of prepared sentence-to-be-recognized candidates, the voice recognition device in accordance with this Embodiment 2 creates a voice recognition dictionary from the sentences to be recognized which have been stored in the storage unit 23 until then. Because the voice recognition device in accordance with this Embodiment 2 is constructed in this way, the voice recognition device can suppress increase in the dictionary size of the voice recognition dictionary. Accordingly, the voice recognition device is suitable for a case in which the voice recognition device is constructed by using embedded software.

Embodiment 3

Figure 7:
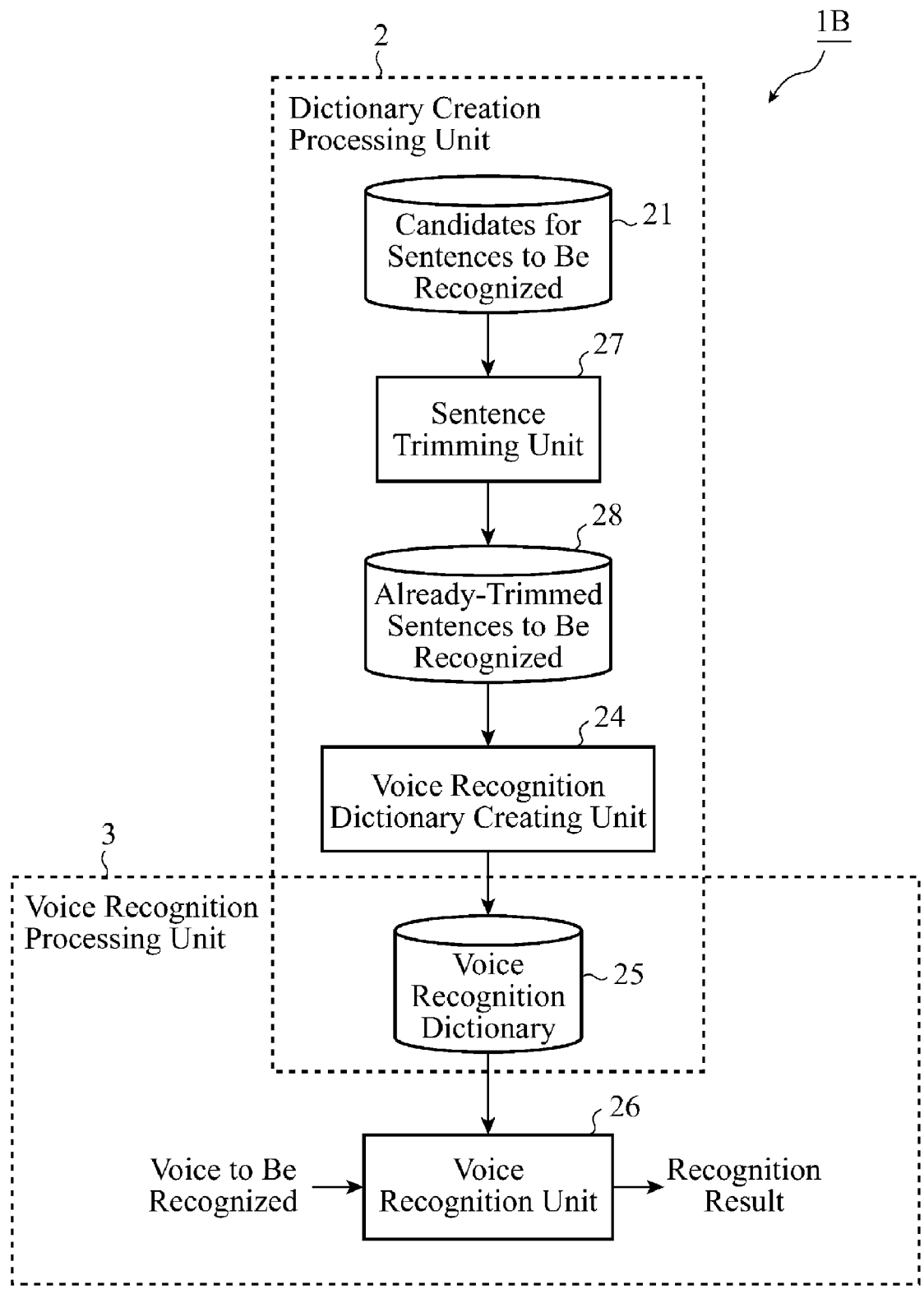
FIG. 7 is a block diagram showing the structure of a voice recognition device in accordance with Embodiment 3 of the present invention.

FIG. 7 is a block diagram showing the structure of a voice recognition device in accordance with Embodiment 3 of the present invention. As shown in FIG. 7, although the voice recognition device 1B in accordance with Embodiment 3 has the same structure as that in accordance with above-mentioned Embodiment 1 shown in FIG. 1 fundamentally, the voice recognition device in accordance with Embodiment 3 differs from that in accordance with Embodiment 1 in that a sentence trimming unit 27 according to the number of acoustic units included in each sentence-to-be-recognized candidate is disposed instead of the sentence selecting unit 22 for selecting sentences to be recognized according to the number of acoustic units included in each sentence-to-be-recognized candidate, and a storage unit 28 for storing already-trimmed sentences to be recognized is disposed instead of the sentence-to-be-recognized storage unit 23.

The sentence trimming unit 27 is a unit for, when a sentence-to-be-recognized candidate has a series of acoustic units whose number exceeds a defined number, trimming away a syllable including an acoustic unit at which the number of acoustic units included in the sentence candidate exceeds the defined number first, and subsequent syllables from the above-mentioned sentence to form a text. Although sentences or texts having many acoustic units result in increase of the voice recognition dictionary size, the voice recognition device in accordance with this Embodiment 3 forms even such a text into a text in which acoustic units reduced in number so as not to exceed the defined number are recognizable.

The storage unit 28 stores sentences to be recognized on which the trimming process is performed by the sentence trimming unit 27. Because the other structural components other than the sentence trimming unit 27 and the storage unit 28 are the same as those in accordance with above-mentioned Embodiment 1, the explanation of the other structural components will be omitted hereafter.

Next, the operation of the voice recognition device will be explained.

Figure 8:
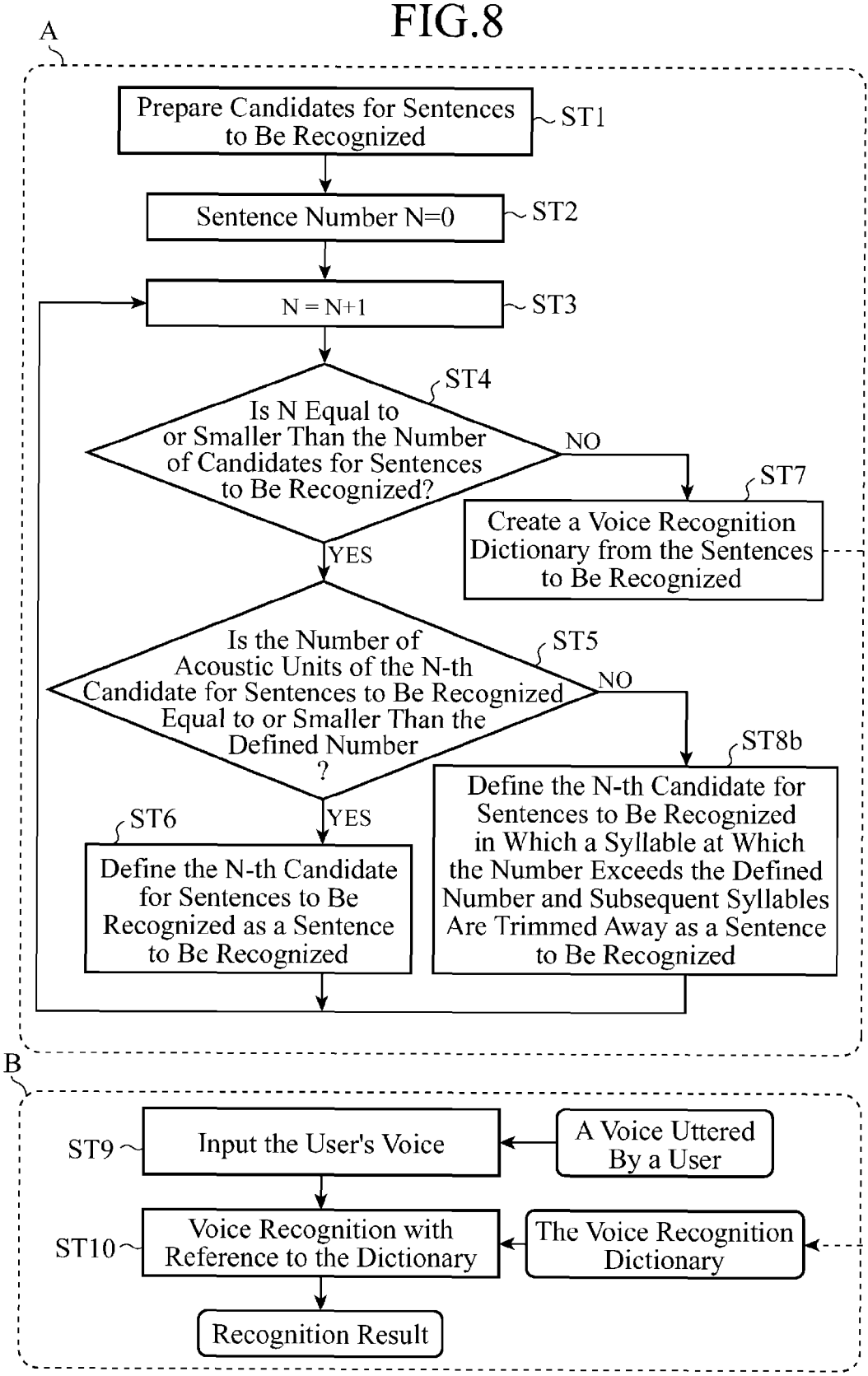
FIG. 8 is a flow chart showing a flow of the operation of the voice recognition device in accordance with Embodiment 3.

FIG. 8 is a flow chart showing a flow of the operation carried out by the voice recognition device in accordance with Embodiment 3. Steps enclosed by a dashed line designated by a symbol A in FIG. 8 show processes carried out by a dictionary creation processing unit 2, and steps enclosed by a dashed line designated by a symbol B in FIG. 8 show processes carried out by a voice recognition processing unit 3. In FIG. 8, because processes in steps ST1 to ST7 are the same as those shown in FIG. 2 of above-mentioned Embodiment 1, the explanation of the processes will be omitted hereafter.

When the number of acoustic units included in a sentence-to-be-recognized candidate corresponding to a sentence number N is neither equal to nor smaller than the defined number (if No in step ST5), the sentence trimming unit 27 trims away a syllable including an acoustic unit at which the number of acoustic units included in the sentence-to-be-recognized candidate exceeds the above-mentioned defined number first, and subsequent syllables from the above-mentioned sentence-to-be-recognized candidate to form a sentence, and stores this sentence into the storage unit 28 as a sentence to be recognized having the sentence number N (step ST8b).

When completing the process in step ST6 or ST8b, the sentence trimming unit 27 returns to step ST3 and increments the counted value of a counter for counting the sentence number N by one, and then repeatedly performs the processes in steps ST4 to ST8b on the sentence-to-be-recognized candidate corresponding to the next sentence number.

Hereafter, the sentence trimming process in step ST8b will be explained.

FIG. 9 is a view for explaining the trimming process of trimming a sentence-to-be-recognized candidate, and shows a case in which phonemes are used as acoustic units, and each sentence-to-be-recognized candidate having phonemes whose number exceeds 20 is formed into a sentence to be recognized in which a syllable including a phoneme at which the number of acoustic units included in the sentence-to-be-recognized candidate exceeds 20 first, and subsequent syllables are trimmed away from the sentence-to-be-recognized candidate. In an example shown in a upper portion of FIG. 9, sentence-to-be-recognized candidates having sentence numbers N=1, 6 and 8 are objects to be trimmed. In this case, as shown in a lower portion of FIG. 9, the sentence trimming unit 27 trims away a syllable including a phoneme at which the number exceeds 20 first, and subsequent syllables from each of the sentence-to-be-recognized candidates.

For example, the sentence-to-be-recognized candidate having the sentence number N=1 which is "Kanagawaken Kamakurasi" has a phoneme string of "kanagawakeN kamakurasi" (21 phonemes), and the number of phonemes included in this sentence-to-be-recognized candidate exceeds 20. Therefore, the sentence trimming unit determines the syllable "si" including a phoneme at which the number exceeds 20 first, and subsequent syllables, as an object to be trimmed away, to newly define "kanagawakeN kamakura" (19 phonemes) as a sentence to be recognized. More specifically, the sentence trimming unit newly defines, as the end of the text, the syllable just before the syllable "si" including the phoneme "i" at which the number of phonemes included in the original text exceeds 20. The sentence trimming unit also performs the same sentence trimming process on each of the sentence-to-be-recognized candidates having sentence numbers 6 and 8, and, after that, provides only the sentence-to-be-recognized candidates each having phonemes whose number is 20 or less as already-trimmed sentences to be recognized.

Instead of performing the sentence trimming process on a per-syllable basis, the sentence trimming unit can perform the sentence trimming process on a per-phoneme basis. For example, in the example of "kanagawakeN kamakurasi", the phoneme at which the number of phonemes included in the original text exceeds 20 first is the object to be trimmed away, and "kanagawakeN kamakuras" (20 phonemes) is defined newly as a sentence to be recognized. More specifically, the sentence trimming unit newly defines, as the end of the text, the phoneme just before the phoneme "i" at which the number of phonemes included in the original text exceeds 20.

Referring again to the explanation of FIG. 8, when the sentence number N exceeds the number of prepared sentence-to-be-recognized candidates (the sentence number N>the number of prepared sentence-to-be-recognized candidates) (if No in step ST4), a voice recognition dictionary creating unit 24 creates a voice recognition dictionary from only the already-trimmed sentences to be recognized which have been stored in the storage unit 23 till then (step ST7). The created voice recognition dictionary is stored in a storage unit 25.

A voice recognition unit 26 of the voice recognition processing unit 3 inputs a voice to be recognized uttered by a user (step ST9), and performs a voice recognition process on the voice to be recognized with reference to the voice recognition dictionary stored in the storage unit 25, and outputs a recognition result (step ST10).

As mentioned above, the voice recognition device in accordance with this Embodiment 3 includes the sentence trimming unit 27 for, when a sentence-to-be-recognized candidate has a series of acoustic units whose number exceeds the defined number, trimming away either a acoustic unit at which the number of acoustic units included in the sentence candidate exceeds the defined number first, and subsequent acoustic units, or a syllable including the above-mentioned acoustic unit and subsequent syllables from the above-mentioned sentence candidate to define this trimmed sentence candidate as a sentence to be recognized. Therefore, the voice recognition device in accordance with this Embodiment 3 can form such a sentence-to-be-recognized candidate into a sentence to be recognized in which acoustic units reduced in number so as not to exceed the defined number are recognizable, and can suppress increase in the dictionary size of the voice recognition dictionary without reducing the number of recognizable words as much as possible. Accordingly, the voice recognition device is suitable for a case in which the voice recognition device is constructed by using embedded software.

Embodiment 4

Figure 10:
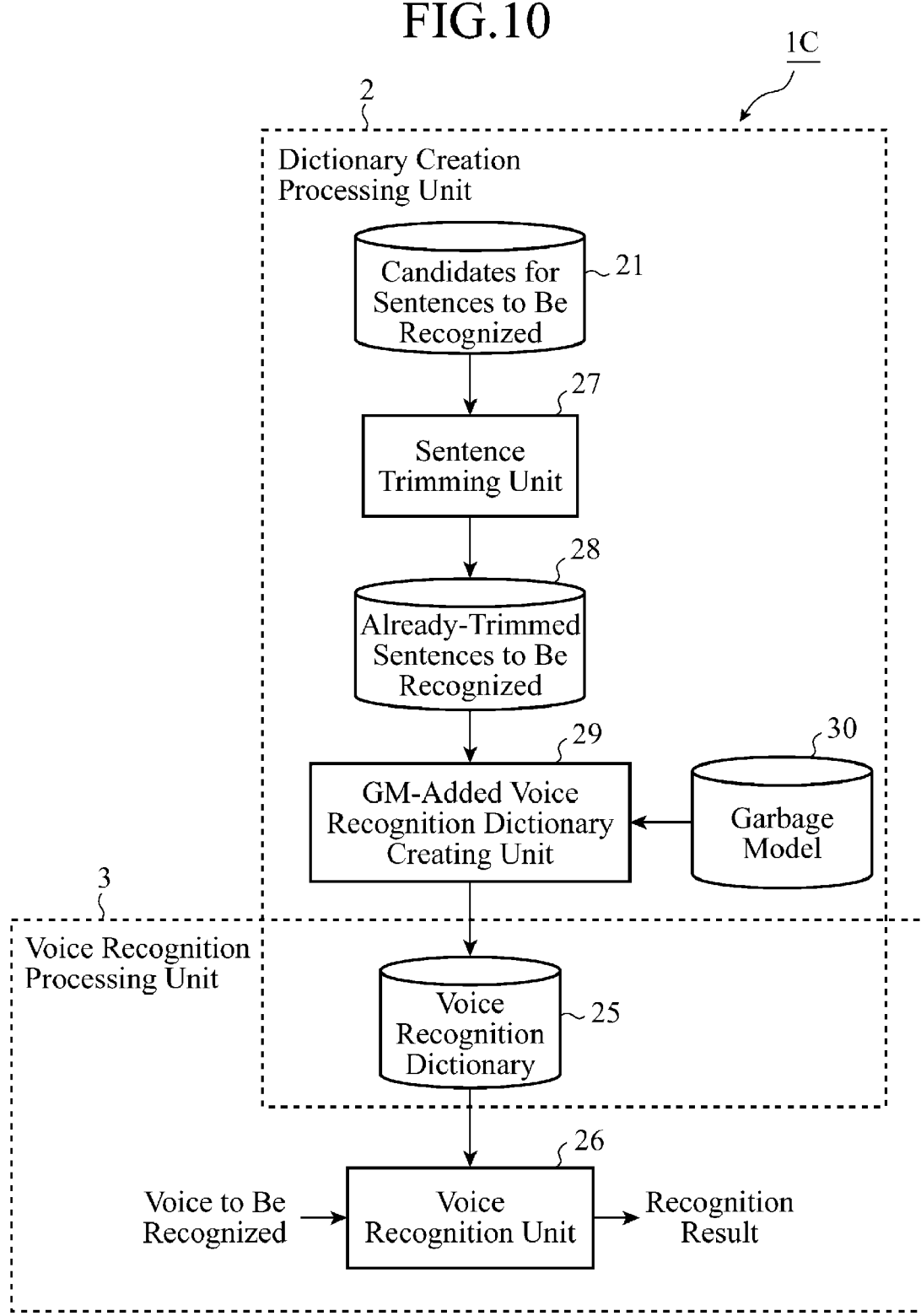
FIG. 10 is a block diagram showing the structure of a voice recognition device in accordance with Embodiment 4 of the present invention.

FIG. 10 is a block diagram showing the structure of a voice recognition device in accordance with Embodiment 4 of the present invention. As shown in FIG. 10, although the voice recognition device 1C in accordance with Embodiment 4 has the same structure as that in accordance with above-mentioned Embodiment 3 shown in FIG. 7 fundamentally, the voice recognition device in accordance with Embodiment 4 differs from that in accordance with Embodiment 3 in that a GM-added voice recognition dictionary creating unit 29 for creating a voice recognition dictionary by using sentences to be recognized in each of which a garbage model (properly abbreviated as a GM from here on) is added to an already-trimmed sentence is disposed instead of the voice recognition dictionary creating unit 24, and a storage unit 30 for storing garbage models is disposed.

The GM-added voice recognition dictionary creating unit 29 is a unit for adding a garbage model to each already-trimmed sentence to be recognized to create a voice recognition dictionary. Each garbage model stored in the storage unit 30 is configured in such a way as to detect a voice interval, and even a voice followed by an unknown utterance including an unnecessary term or noise can be recognized.

Therefore, a garbage model is added to before and after each recognizable word in the voice recognition dictionary so that the voice recognition device can recognize an utterance of the above-mentioned recognizable word even though an additional word is added before and after the above-mentioned recognizable word. As a result, a portion which had followed each already-trimmed sentence to be recognized which is ended somewhere in the original sentence can be recognized, and therefore reduction in the score (likelihood) acquired as a recognition result can be prevented. Because the other structural components other than the GM-added voice recognition dictionary creating unit 29 and the storage unit 30 are the same as those in accordance with above-mentioned Embodiment 3, the explanation of the other structural components will be omitted hereafter.

Next, the operation of the voice recognition device will be explained.

Figure 11:
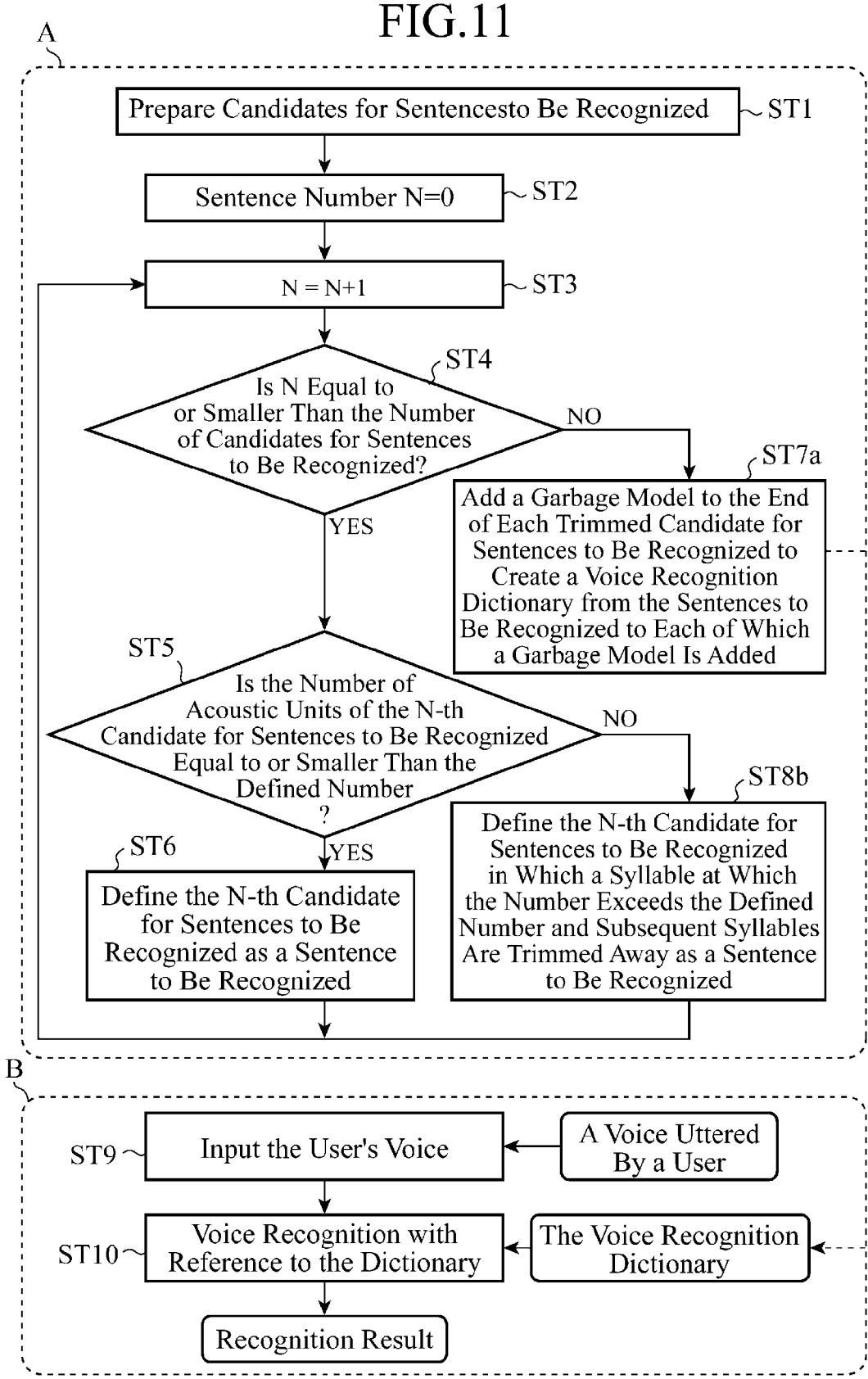
FIG. 11 is a flow chart showing a flow of the operation of the voice recognition device in accordance with Embodiment 4.

FIG. 11 is a flow chart showing a flow of the operation carried out by the voice recognition device in accordance with Embodiment 4. Steps enclosed by a dashed line designated by a symbol A in FIG. 11 show processes carried out by a dictionary creation processing unit 2, and steps enclosed by a dashed line designated by a symbol B in FIG. 11 show processes carried out by a voice recognition processing unit 3. In FIG. 11, because processes in steps ST1 to ST6 and ST8b are the same as those shown in FIG. 8 of above-mentioned Embodiment 3, the explanation of the processes will be omitted hereafter.

When a sentence number N exceeds the number of prepared sentence-to-be-recognized candidates (the sentence number N>the number of prepared sentence-to-be-recognized candidates) (if No in step ST4), the GM-added voice recognition dictionary creating unit 29 adds a garbage model read out of the storage unit 30 to the end of each already-trimmed sentence to be recognized which has been stored in a storage unit 28 until then, and creates a voice recognition dictionary from the sentences to be recognized to each of which a garbage model is added (step ST7a). The created voice recognition dictionary is stored in a storage unit 25.

A voice recognition process of referring to the voice recognition dictionary created through the above-mentioned processes (steps ST9 and ST10) is the same as that shown in above-mentioned Embodiment 1.

Explaining with reference to the example of FIG. 9 shown in above-mentioned Embodiment 3, when the sentences to be recognized having sentence numbers N=1, 6, and 8 have been trimmed, a sentence trimming unit 27 sets a flag showing that the trimming has been done to each of these sentences to be recognized. After the GM-added voice recognition dictionary creating unit 29 refers to the value of the flag set to each of the sentence to be recognized and specifies that each of these sentence to be recognized has been trimmed, the GM-added voice recognition dictionary creating unit 29 adds a garbage model to the end of each of the sentences to be recognized having sentence numbers N=1, 6, and 8 to create a voice recognition dictionary by using these sentences to be recognized.

As mentioned above, because the voice recognition device in accordance with this Embodiment 4 adds a garbage model to the end of each of already-trimmed sentences to be recognized to create a voice recognition dictionary, the voice recognition device can recognize even an already-trimmed sentence without reducing the number of recognizable words as far as possible. Therefore, the voice recognition device can suppress increase in the dictionary size of the voice recognition dictionary and prevent reduction in the score acquired as a recognition result. Accordingly, the voice recognition device is suitable for a case in which the voice recognition device is constructed by using embedded software.

Embodiment 5

Figure 12:
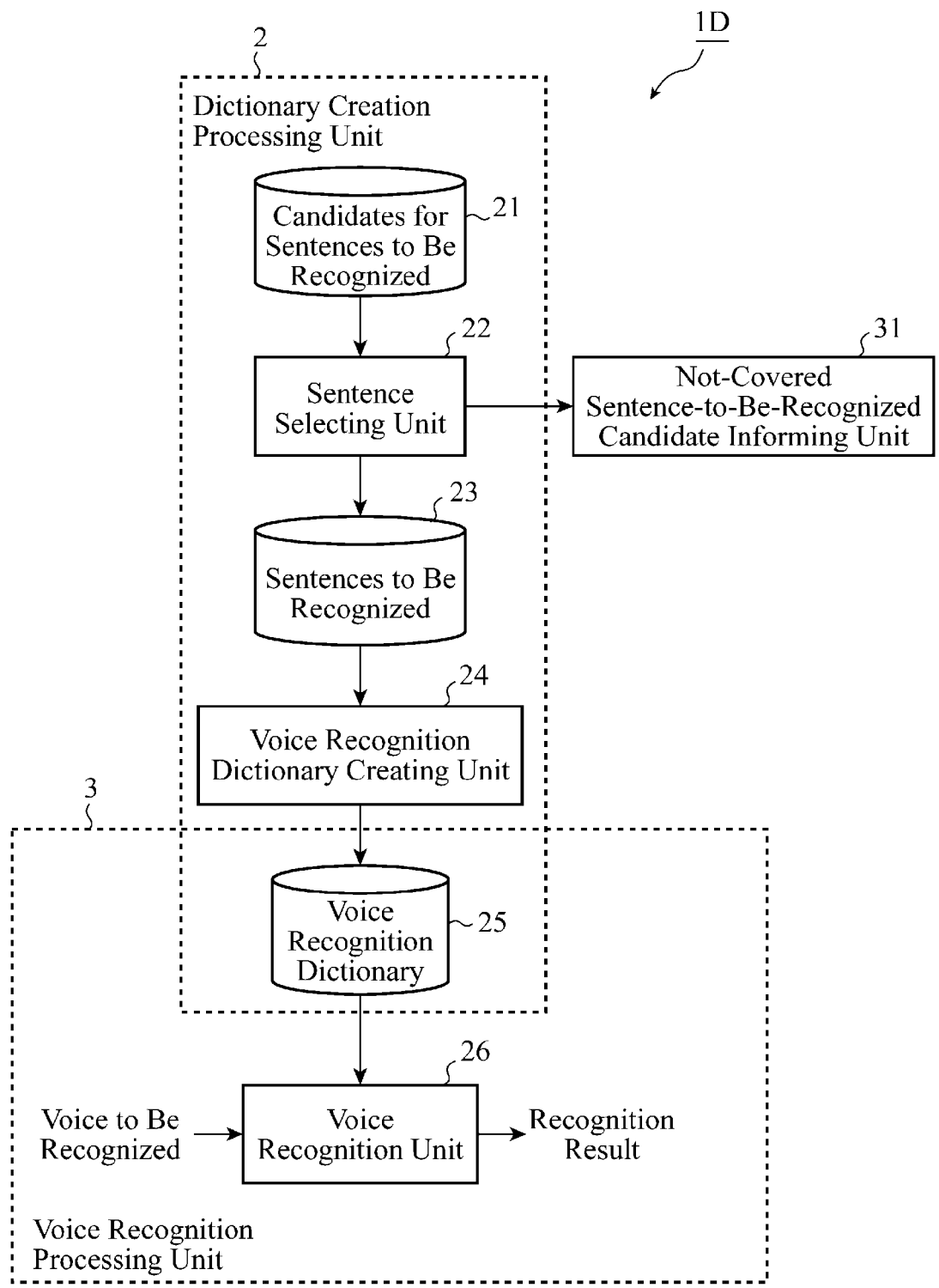
FIG. 12 is a block diagram showing the structure of a voice recognition device in accordance with Embodiment 5 of the present invention.

FIG. 12 is a block diagram showing the structure of a voice recognition device in accordance with Embodiment 5 of the present invention. As shown in FIG. 12, although the voice recognition device 1D in accordance with Embodiment 5 has the same structure as that in accordance with above-mentioned Embodiment 1 shown in FIG. 1 fundamentally, the voice recognition device in accordance with Embodiment 5 differs from that in accordance with Embodiment 1 in that a not-covered object-to-be-recognized candidate informing unit 31 is disposed. The not-covered object-to-be-recognized candidate informing unit 31 is a unit for informing a user about sentence-to-be-recognized candidates excluded by a sentence selecting unit 22 as not-covered objects to be recognized. Because the other structural components other than the not-covered object-to-be-recognized candidate informing unit 31 are the same as those in accordance with above-mentioned Embodiment 1, the explanation of the other structural components will be omitted hereafter.

Next, the operation of the voice recognition device will be explained.

Figure 13:
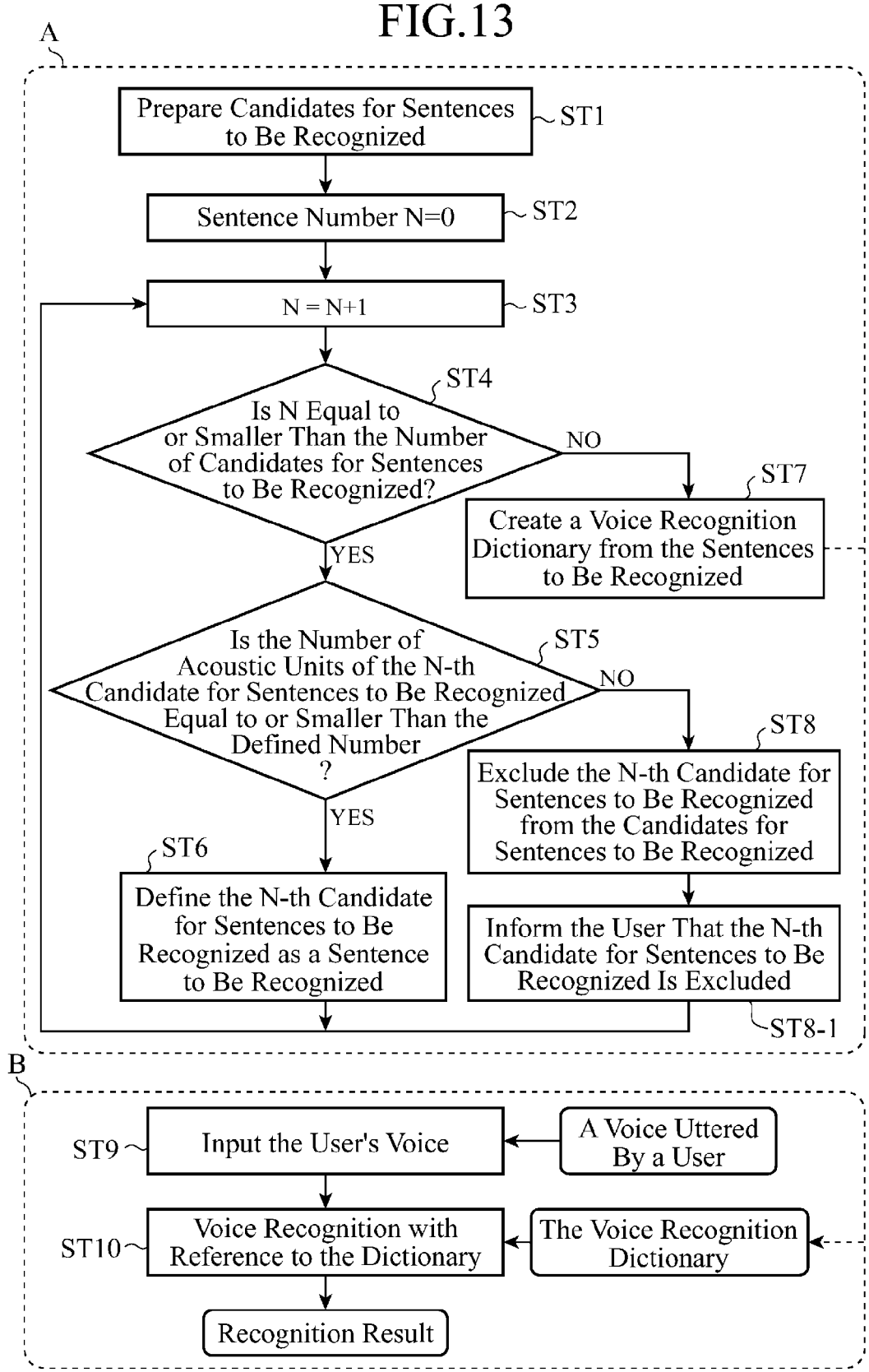
FIG. 13 is a flow chart showing a flow of the operation of the voice recognition device in accordance with Embodiment 5.

FIG. 13 is a flow chart showing a flow of the operation carried out by the voice recognition device in accordance with Embodiment 5. Steps enclosed by a dashed line designated by a symbol A in FIG. 13 show processes carried out by a dictionary creation processing unit 2, and steps enclosed by a dashed line designated by a symbol B in FIG. 13 show processes carried out by a voice recognition processing unit 3. In FIG. 13, because processes in steps ST1 to ST8 are the same as those shown in FIG. 2 of above-mentioned Embodiment 1, the explanation of the processes will be omitted hereafter.

When excluding sentence-to-be-recognized candidates each having acoustic units whose number exceeds a defined number in step ST8, the sentence selecting unit 22 informs the not-covered object-to-be-recognized candidate informing unit 31 about the sentence-to-be-recognized candidates which are to be excluded. When a voice recognition dictionary creating unit 24 creates a voice recognition dictionary, the not-covered object-to-be-recognized candidate informing unit 31 informs the user about the above-mentioned sentence-to-be-recognized candidates informed thereto (step ST8-1). Because the voice recognition device is constructed in this way, the voice recognition device voice makes it possible for the user to know the not-covered objects to be recognized.

For example, in a case in which phonemes are used as acoustic units, and only sentences having 20 or less phonemes are selected as objects to be recognized, as shown in FIG. 3 shown in above-mentioned Embodiment 1, a sentence-to-be-recognized candidate "Kanagawaken Kamakurasi" is an object to be excluded because the phonemes of the sentence-to-be-recognized candidate are "kanagawakeN kamakurasi" (21 phonemes) and the number of phonemes exceeds 20. At this time, the not-covered object-to-be-recognized candidate informing unit 31 informs the user that the above-mentioned words are a not-covered object to be recognized. As an informing method, a method of informing the user that the above-mentioned words are a not-covered object to be recognized by using an entry showing the words which are a not-covered object to be recognized, and a telop showing that the words are a not-covered object to be recognized can be provided, as shown in FIG. 14.

Returning to the explanation of FIG. 13, when the process of step ST6 or ST8-1 is completed, the sentence selecting unit 22 returns to step ST3 and increments the counted value of a counter for counting a sentence number N by one, and then repeatedly performs the processes in steps ST4 to ST8-1 on the sentence-to-be-recognized candidate corresponding to the next sentence number.

A voice recognition process of referring to a voice recognition dictionary created through the above-mentioned processes (steps ST9 and ST10) is the same as that shown in above-mentioned Embodiment 1.

As mentioned above, because the voice recognition device in accordance with this Embodiment 5 includes the not-covered object-to-be-recognized candidate informing unit 31 for informing a user about candidates which are not selected as sentences to be recognized and candidates which are objects subjected to a trimming process, the voice recognition device can suppress increase in the dictionary size of the voice recognition dictionary while enabling the user to understand in advance the words which are not-covered objects to be recognized. Accordingly, the convenience of the voice recognition device is improved, and the voice recognition device is suitable for a case in which the voice recognition device is constructed by using embedded software.

The not-covered object-to-be-recognized candidate informing unit 31 in accordance with above-mentioned Embodiment 5 can be added to the structure in accordance with any one of above-mentioned Embodiments 2 to 4. In this case, the not-covered object-to-be-recognized candidate informing unit 31 informs the user about candidates for sentences to be recognized which are objects to be excluded selected by the sentence selecting unit 22a or candidates for sentences to be recognized which are objects to be trimmed selected by the sentence trimming unit 27. Even in the case in which the voice recognition device is constructed in this way, the voice recognition device enables the user to understand in advance texts which are excluded from objects to be recognized or which are trimmed recognizable words which are ended somewhere in the original sentence when creating a voice recognition dictionary. Accordingly, the user's convenience can be improved.

INDUSTRIAL APPLICABILITY

The voice recognition device in accordance with the present invention can suppress increase in the size of a voice recognition dictionary which consists of sentences to be recognized. Even in a case in which the voice recognition device is implemented via embedded software for use in equipment, such as a navigation system or a mobile phone, the voice recognition dictionary with a dictionary size falling within the usable capacity of the memory can be implemented. Therefore, the voice recognition device in accordance with the present invention is suitable for use as a voice recognition device that requires a large memory capacity, and so on.

The invention claimed is:

1. A voice recognition device comprising:
   a voice recognition dictionary creating unit configured to create a voice recognition dictionary from sentences to be recognized;
   a voice recognition unit configured to perform voice recognition on a voice which is an object to be recognized with reference to said voice recognition dictionary; and
   a sentence selecting unit configured to select sentences each having a predetermined number or less of acoustic units as said sentences to be recognized from candidates for said sentences to be recognized.

2. The voice recognition device according to claim 1, said voice recognition device includes an informing unit for informing a user about a candidate which is not selected as a sentence to be recognized.

3. A voice recognition device comprising:
   a voice recognition dictionary creating unit configured to create a voice recognition dictionary from sentences to be recognized;
   a voice recognition unit configured to perform voice recognition on a voice which is an object to be recognized with reference to said voice recognition dictionary; and
   a sentence selecting unit configured to select sentences having acoustic units whose total number is equal to or smaller than a predetermined number from candidates for said sentences to be recognized to define said sentences selected thereby as said sentences to be recognized.

4. The voice recognition device according to claim 3, said voice recognition device includes an informing unit for informing a user about a candidate which is not selected as a sentence to be recognized.

5. A voice recognition device comprising:
   a voice recognition dictionary creating unit configured to create a voice recognition dictionary from sentences to be recognized;
   a voice recognition unit configured to perform voice recognition on a voice which is an object to be recognized with reference to said voice recognition dictionary; and
   a sentence trimming unit configured to, when a candidate for one of said sentences to be recognized has a series of acoustic units whose number exceeds a predetermined number, trim away either an acoustic unit of a portion at which the number of acoustic units exceeds the predetermined number first and subsequent acoustic units or a syllable including said acoustic unit and subsequent syllables from said candidate to define said trimmed candidate as one of said sentences to be recognized.

6. The voice recognition device according to claim 5, wherein the voice recognition dictionary creating unit adds a garbage model to an end of the one of said sentences to be recognized on which the trimming process has been performed by the sentence trimming unit, and creates the voice recognition dictionary from said sentence to be recognized to which said garbage model is added.

7. The voice recognition device according to claim 5, said voice recognition device includes an informing unit for informing a user about a candidate which is an object subjected to a trimming process as a sentence to be recognized.

* * * * *